(No Model.)
S. H. JOHNSON & H. C. STOWE.
STRUCTURAL HOLLOW SHAFT.
No. 508,826. Patented Nov. 14, 1893.
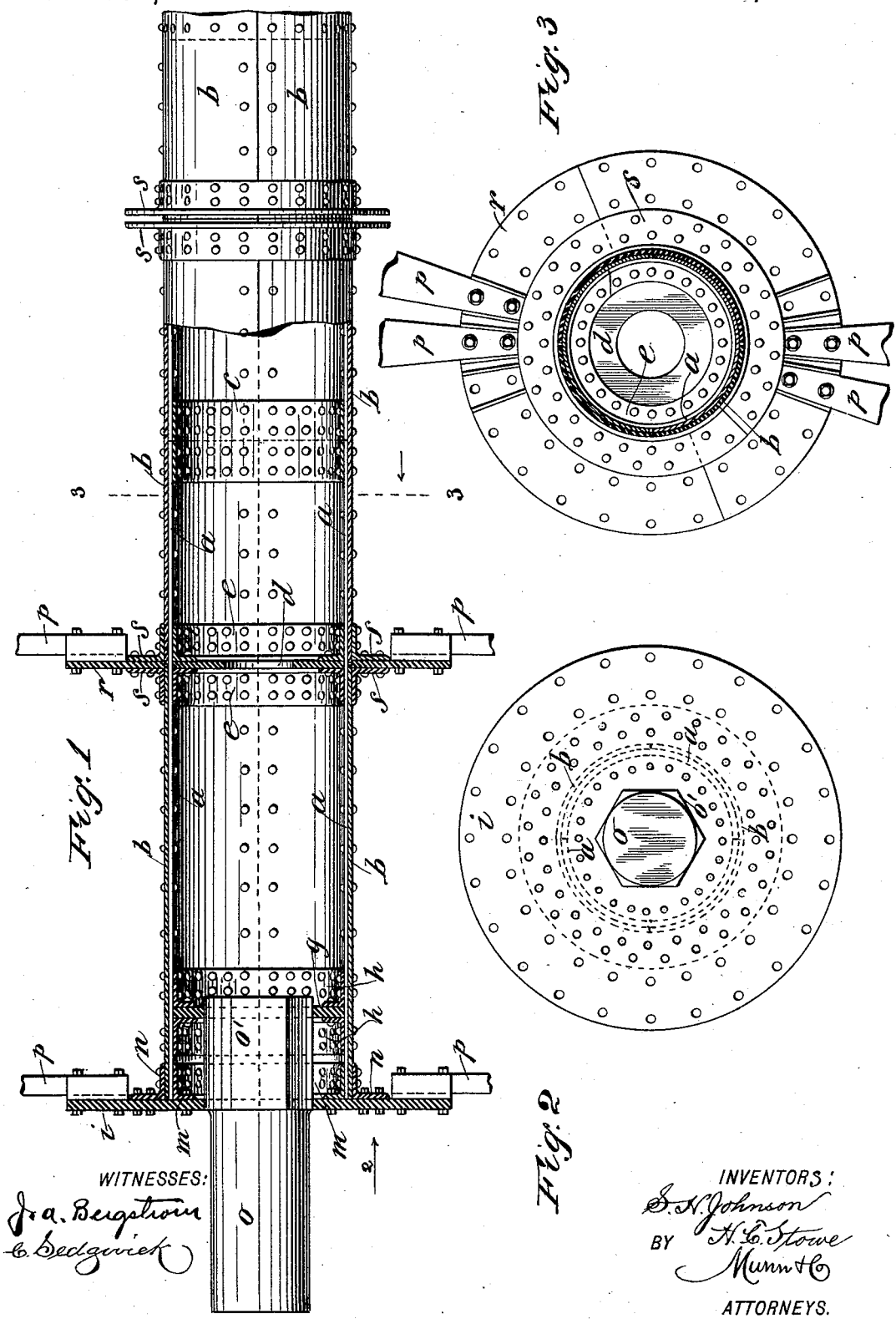
WITNESSES:
Jra. Bergstrom
C. Sedgwick
INVENTORS:
S. H. Johnson
H. C. Stowe
BY Munn & Co
ATTORNEYS.

UNITED STATES PATENT OFFICE.

SAMUEL H. JOHNSON, OF PITTSBURG, PENNSYLVANIA, AND HAROLD C. STOWE, OF NEW YORK, N. Y.

STRUCTURAL HOLLOW SHAFT.

SPECIFICATION forming part of Letters Patent No. 508,826, dated November 14, 1893.

Application filed February 3, 1893. Serial No. 460,850. (No model.)

*To all whom it may concern:*

Be it known that we, SAMUEL H. JOHNSON, of Pittsburg, in the county of Allegheny and State of Pennsylvania, and HAROLD C. STOWE, of New York city, in the county and State of New York, have invented a new and useful Structural Hollow Shaft, of which the following is a full, clear, and exact description.

In the manufacture of heavy and long solid shafts of wrought iron or steel, for steamboats and other purposes, it is found to be difficult to produce a shaft body of an equal density throughout its area and extent. This lack of homogeneity, is due to the large mass of metal which has to be worked for its consolidation, from the surface, either by rolling pressure or by the impact of blows from a forging hammer.

In consequence of the comparative coarseness of the fibrous structure, at and near the center of a large forged or rolled shaft of considerable length, such shafts are frequently broken, when they are subjected to transverse loads and torsional strains while in service and rapidly rotating, as the constant change in direction of the incidental strains mentioned, has a tendency to change the molecular structure of the shaft body from a fibrous to a crystalline nature, which thus greatly weakens the shaft, and renders it liable to sudden breakage.

The object of our invention is, to produce a composite hollow shaft for steamboats and other purposes, which will be adapted to resist transverse and torsional strains in a large degree, which will be cheap to manufacture, comparatively light and easy to handle, and that may be easily repaired when injured in part, by accident.

To this end our invention consists in the construction of a comparatively large shaft from a plurality of formed plates that are secured together so as to break joints laterally and longitudinally, and also in the reinforcing of said plates by junction sleeves internally secured, and further stiffening the structure by the introduction and fixture of transverse diaphragm walls of metal at intervals in the length of the structural hollow shaft body, in order to produce a cylindrical or polygonal shaft of great strength.

Our invention also comprehends the provision of solid cylindric journal stub ends for the hollow shaft body, and the furnishing of efficient and practical means for the reliable and expeditious, as well as accurate, attachment of said journal ends axially coincident with the hollow body of the composite shaft.

Our invention further comprises the provision of any number of intermediate solid cylindrical bearing supports for the hollow composite shaft, and furthermore consists in the construction and combination of parts, as is hereinafter described and claimed.

Reference is to be had to the accompanying drawings forming a part of this specification, in which similar letters of reference indicate corresponding parts in all the figures.

Figure 1 is a side view of the structural hollow shaft as formed for the stern paddle wheel of a steamboat, the shaft being partly in section and broken away at one end, an attached journal shaft and paddle arms, in part, being also shown in connection with the hollow shaft. Fig. 2 is an end view of the shaft and its journal stub end, opposite the arrow 2, in Fig. 1; and Fig. 3 is a transverse sectional view of the shaft completed in its body, and attachments therefor, taken on the line 3—3 in Fig. 1, looking in the direction of the arrow in said figure.

The shaft shown, is given a cylindrical form, but it is not intended to restrict the formation of the improvement to such a shape, as it is as easy to produce polygonal shaped shafts as those that are circular in cross section, if this is desired.

In the drawings, *a* represents a set of plate metal sections that form the inner shell of the hollow shaft and these as represented are each semi-circular in cross section; but this is not imperative, as the number of sections required to afford a cylindric inner shell for the shaft may be increased above two, which is the number exhibited to illustrate the principle of construction embodied in our invention. The inner shell sections *a*, are formed as longitudinal members of a complete cylinder, and on their exterior surface similar plate sections *b*, are imposed, the radius of the arc that defines their degree of curvature in cross section being so increased, as to adapt these outer sections to have intimate contact throughout their areas, with the shell sections they are to envelop. Any convenient length is given to the plate sections $a$ and $b$, and if the entire length of the shaft to be formed is in excess of the length of the plate sections, there may be two or more plate members abutted at their ends, to afford a proper length for each shell section. The several shell sections $a$ forming the inner shaft shell, are held assembled by any proper means, and on their exteriors the outer shell sections $b$, are imposed so as to break joints regularly, and all are successively secured together with rivets or equivalent means; and it will be seen that if two or more plate sections are required to be arranged in sequence for the production of a long shaft, such a construction of the composite shaft will require that the joints where the inner members join endwise, should be placed intermediately of the abutting joints of the outer plates.

Where joints occur in the length of the shaft as just explained, it is of advantage to introduce a reinforcing sleeve such as is shown at $c$ in Fig. 1, the line of juncture of the plate sections in sequence, being indicated by a transverse dotted line.

At selected points in the length of the hollow shaft any desired number of diaphragm plates $d$, are introduced within the inner shell of the shaft. These plates may be solid disks, or made in annular form, as shown in Fig. 1. On each side of a diaphragm plate $d$, the similar ring braces $e$, are placed, and each consists of a circular corner plate bent into right-angle form in cross section, as represented in Fig. 1. The ring braces $e$, each have one flange secured by rivets or like means, upon the diaphragm plate $d$, oppositely, and their other flanges similarly affixed upon the inner shell of the shaft, so as to greatly strengthen the latter; the rivets which secure the ring braces to the shaft shells $a$ and $b$, passing through both shells so as to bind them together at the points where the diaphragm plates are introduced.

Within the shell made up of the plates $a$, one or more transverse thick diaphragms $g$, are inserted, at a proper distance from each end of the hollow shaft body, these transverse plates being centrally apertured, by preference in polygonal form and the apertures may be shaped triangular, square, hexagonal, or have any increased number of corners if desired. Each diaphragm $g$, is reinforced laterally, by angle-rings $h$, of the same form as the ring braces $e$, which angle-rings are riveted or bolted to the diaphragm and to the shells $a$, $b$, as before explained with regard to the ring braces.

On the ends of the hollow shaft sections $a$ comparatively thick head plate $i$, is imposed, said plates being circular on the edges and flat on the sides, having a proportionate diameter that affords a considerable marginal projection, if the hollow shaft is to be used in connection with a steamboat stern paddle wheel. The head plates $i$, are secured upon the shaft ends by their attachment to the angle rings $m$ and $n$, respectively affixed upon the inner and outer surfaces of the joined shells $a$ and $b$, at their outer ends, as indicated at the left in Fig. 1. Each end wall or head plate $i$ is centrally apertured to exactly correspond in shape with the form of the aperture in the interior diaphragms $g$, and have the polygonal sides of the holes disposed respectively in the same planes, so as to adapt the head plates $i$, and diaphragms $g$, at each end of the hollow shaft body, to receive a similarly formed solid shaft end portion.

There is a solid short shaft $o$, provided for each end of the composite hollow shaft, which shafts are of like form, each consisting of a billet of steel or iron, shaped for a portion of its length from one end toward the other to adapt it to exactly mate the shape of the apertures in the head plates $i$, and diaphragms $g$, as shown at $o'$ in Fig. 1. A part of each of the shafts $o$, is made cylindrical, and may be rendered true before an insertion of the solid shafts into the hollow shaft body, or this may be effected after these parts are assembled to produce a completed shaft. The portions of the solid short shafts $o$, which are designed to engage the head plates $i$, and diaphragms $g$, should be slightly greater in diameter than the diameter of the apertures into which they are to be introduced, which operation is effected either by expanding the hollow shaft body at its ends by applied heat, to admit the solid shaft ends freely and bind upon said ends by a subsequent contraction of the metal due to cooling the same; or hydraulic machine pressure may be utilized to insert the solid shafts or journal ends $o$, into the aligning holes in the head plates and diaphragms. Keys may also be employed to secure the shaft ends $o'$ in place, if preferred.

Should it be desired to furnish the hollow structural shaft with one or more intermediate solid journals, this can be readily effected, if the cylindric journal shafts are each furnished with polygonal end portions to enter the similarly perforated head plates and adjacent diaphragms of two hollow shafts, that when connected by the enforced insertion of the journal shafts, will be axially aligned and in effect become one shaft.

To adapt the hollow shaft for service as a support for paddle arms, such as $p$, shown broken in Fig. 1, radial flanges $r$, are furnished in proper number for the reception of said paddle arms, which flanges are each made in two parts, so as to permit them to be located on the exterior of the hollow shaft at proper points. By preference, the flanges $r$, are each placed so as to lie in the same transverse plane with a diaphragm plate $d$, and are secured to the hollow shaft body by the opposite angle-rings $s$, which fit upon the exterior of the hollow shaft and have their flanges secured to the radial flange and also to the shaft body, as represented in Fig. 1. Any proper number of the radial flanges *r*, may be provided, and the head plates *i*, are also employed to sustain the radial paddle arms *p*, that are bolted thereto as shown in Fig. 1.

It is evident that the laminated hollow shaft body, may be employed in lieu of a solid shaft wherever a large and long shaft is required; and it is claimed for this improved structural hollow shaft that a superior quality of material may be economically employed for its formation, as compared to the material composing solid shafts of considerable diameter and length, the intention being to use rolled iron or steel plates, of angular or other form in cross section, and known technically as structural material.

A further advantage consists in the increased durability and capability for resisting load strain in every direction, the large diameter of the shaft that is permissible without entailing excessive weight, adapting the shaft as constructed, to sustain abnormal transverse and torsional strains, in comparison with solid shafts of the best manufacture.

Having thus fully described our invention, we claim as new and desire to secure by Letters Patent—

1. As a new article of manufacture, the herein described hollow shaft, composed of a plurality of shells, each shell composed of separate plates, the longitudinal meeting edges of the plates of the inner shell breaking joint with the similar meeting edges of the outer shell, the two shells being riveted together at such meeting edges, and the shaft thus formed having gudgeons secured to its ends, substantially as described.

2. As a new article of manufacture, the herein described hollow shaft, made up of sections, united end to end, and braced, each section being composed of an inner and an outer shell composed each of separate plates, the longitudinal meeting edges of the plates of the inner shell breaking joint with and united to the plates of the outer shell, and the abutting ends of the inner plates of successive sections, breaking joint with the ends of the plates of the outer shell and gudgeons secured to the ends of such hollow structure, substantially as described.

3. As a new article of manufacture, the herein described hollow shaft, composed of an inner and an outer shell formed of separate riveted plates, of which the meeting edges of the inner plates break joint with those of the outer plates, stiffening annular rings within the shaft, angle rings secured to such stiffening rings and to the shells, end plates held to the shaft by internal and external angle rings thereon, and solid gudgeons secured to the hollow shaft, substantially as described.

SAMUEL H. JOHNSON.
HAROLD C. STOWE.

Witnesses as to Samuel H. Johnson:
J. B. RICHARDS,
JAS. B. RIDGE.

Witnesses as to Harold C. Stowe:
H. C. HARDING,
S. C. WEISKOPF.